Willy O. Frohlich
Harry W. Frohlich
INVENTORS

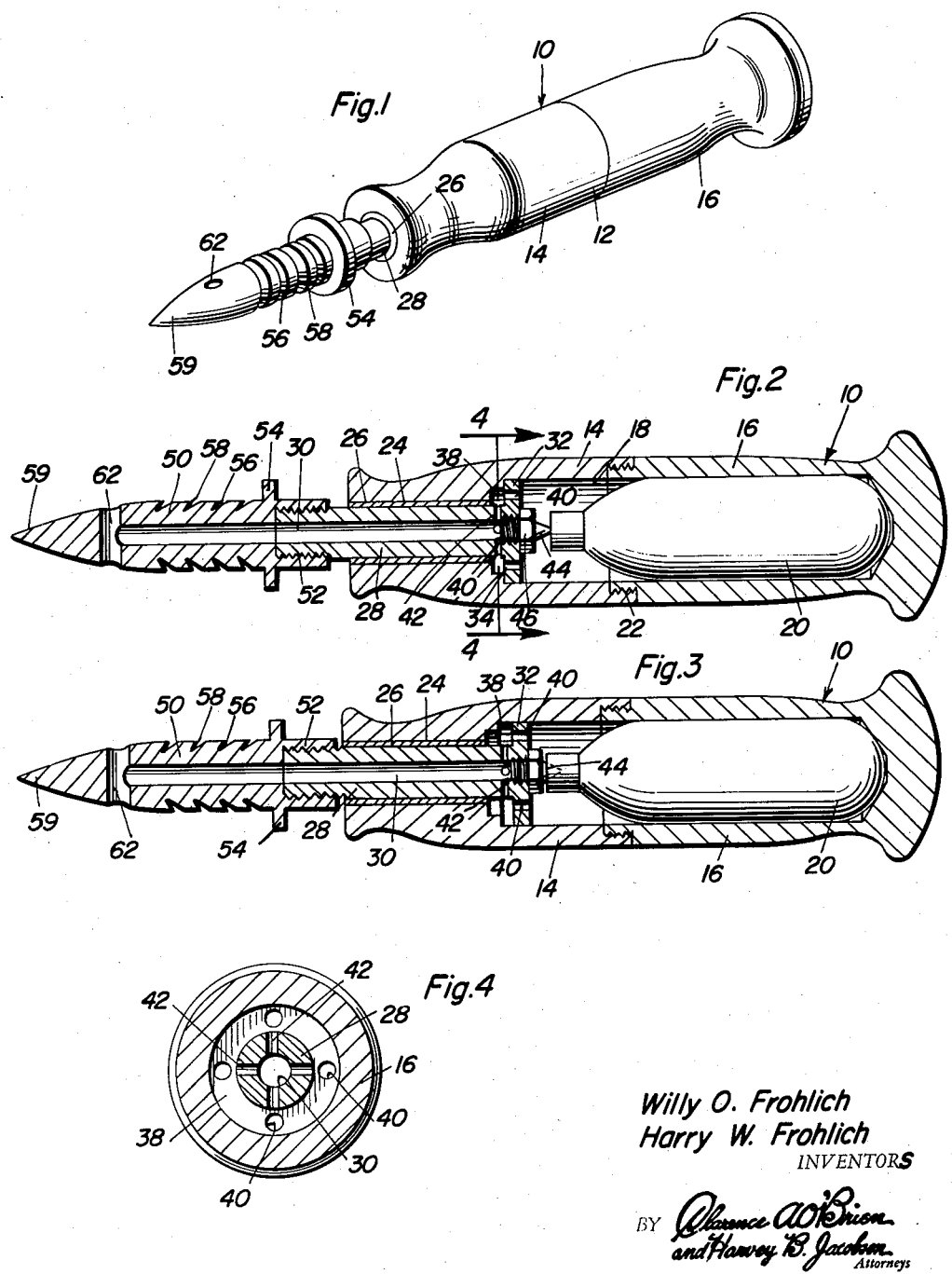

United States Patent Office 2,970,399
Patented Feb. 7, 1961

2,970,399

UNDERWATER WEAPON

Willy O. Frohlich and Harry W. Frohlich, both of 975 Sanger St., Philadelphia 24, Pa.

Filed Feb. 26, 1959, Ser. No. 795,673

8 Claims. (Cl. 43—6)

This invention relates to underwater weapons and more particularly to underwater spears and daggers.

The invention improves the effectiveness of the skin diver's hunting weapons, such as spears and conventional hunting knives. The latter are emergency weapons that are used also by commercial divers and underwater demolition teams.

The skin diver's chief weapon is the spear. He simply thrusts it forward by hand or shoots it from a spear gun for the purpose of killing fish of all sizes and species.

Skin diving as a sport is becoming more popular and daring. Since little or nothing is known of the true habits of many species of sharks or other large or poisonous creatures of the sea, there are incidents where the skin diver is killed or badly injured by the same creature that the skin diver intends to kill with weapons that are now available. Sometimes available weapons only wound the creature and turn it into a demon of fury against which the diver has only an ordinary hunting knife with which to defend himself.

An object of the invention is to provide a practical weapon for underwater use which has application under two different conditions. One weapon constructed in accordance with the invention is to be used strictly as an emergency measure, taking the place of the ordinary hunting knife. The other weapon also constructed in accordance with the invention takes the place of a fishing spear regardless of whether the spear is ejected by a spear gun or manually.

The invention provides an underwater weapon having a conventional flask of carbon dioxide which becomes ruptured upon impact and penetration of the head of the weapon, immediately subsequent to which a charge of carbon dioxide is injected into the sea animal, fish or the like. This ordinarily induces paralysis after which the skin diver may use his own judgment as to what steps are to be taken. Further injection of carbon dioxide, releasing many thousands of cubic centimeters thereof into the fish, can inflate the fish so that it will rise to the surface due to its buoyance. Steps other than these, such as killing the fish, after paralysis, by other means, or capture, are matters within the objective of the diver. The weapon in accordance with the invention, though, to the extent described above, materially aids the skin diver.

The weapon is simple and inexpensive to manufacture. Either form of weapon may be used over and over again by simply replacing the carbon dioxide flask which may be achieved in a few seconds, even under water. Certainly, the weapons may be made in all sizes and shapes, and even to the extent of a size sufficient for effective whaling harpoon operations.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of a hand weapon in accordance with the invention.

Figure 2 is a longitudinal sectional view of the weapon in Figure 1 showing it in one position.

Figure 3 is a longitudinal sectional view of the weapon in Figure 1 showing it in a second position.

Figure 4 is a transverse sectional view taken on the line 4—4 of Figure 2.

Figure 5:
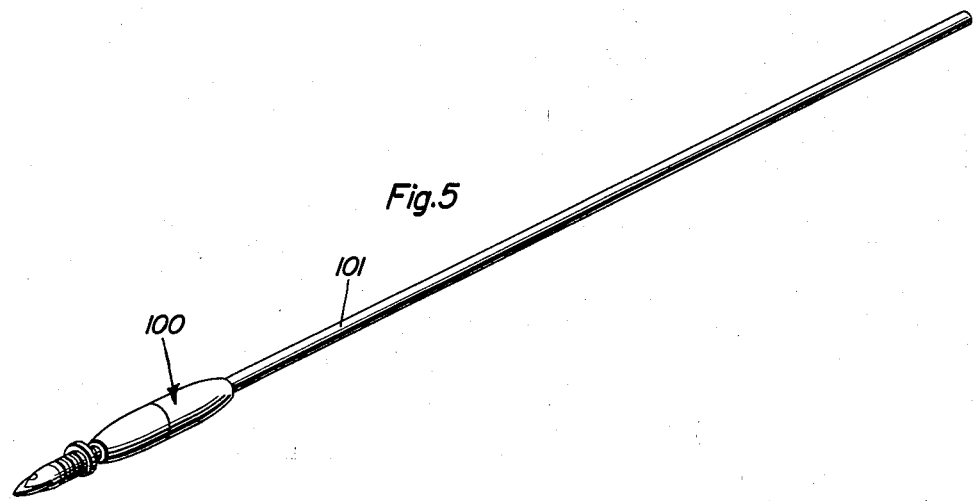
Figure 5 is a perspective view of another weapon constructed in accordance with the invention.

In the accompanying drawings reference is first made to Figures 1-4 inclusive where weapon 10 is illustrated. The weapon, as mentioned previously, is intended to take the place of the ordinary hunting knife which a diver uses as a defense measure. Weapon 10 is made of a hollow handle 12 in two sections 14 and 16. Cavity 18, enclosed by the hollow handle, has a conventional carbon dioxide flask 20 disposed therein. Handle sections 14 and 16 are designed to separate rather easily and quickly so that the flask 20 may be removed and replaced within a matter of a few seconds. Screw threads 22 at the juncture of the sections 14 and 16 provide an inexpensive effective means for separably connecting the sections together.

Passage 24 having a liner 26, is formed as a longitudinal continuation or extension of cavity 18. Shank 28 having a longitudinal passage 30, is mounted for reciprocation in the lined bore 24, and there is a disk 32 at the inner end of the shank. Disk 32 occupies cavity 18 at one end of the flask 20, and its normal position (Figure 2) is at rest against shoulder 34 in cavity 18. When rested against shoulder 34, disk 32 forms a wall of cylindrical groove 38 which functions as a manifold, having gas passages 40 of disk 32 registered with it, and gas passages 42 of shank 28 also registered therewith. Gas passages 42 are radially formed in the shank 28, and they communicate with the main gas discharge passage 30.

Pin 44 is fixed to plug 46 and is disposed in cavity 18 in a poised position adjacent to or lightly contacting the frangible wall of the flask 20 at its neck. Plug 46 is threaded in the inner end part of passage 30 thereby closing the inner end of the passage. The function of pin 44 is to pierce the frangible wall of flask 20 thereby enabling the compressed gas in flask 40 to be discharged into cavity 18 and passage 30, passage 30 being registered with cavity 18 through passages 42, manifold 38 and passages 40.

Head 50 of weapon 10 is of special construction. It has, at one end, an internally threaded socket 52 which is threaded on the externally threaded outer end of shank 28. Therefore, the head 50 is separably connected to shank 28. Flange 54 extends circumferentially outwardly of the head to form a stop that limits the penetration of head 50 into the fish and which definitely assures that shank 28 will be moved inwardly with reference to the handle 12 of weapon 10 when the weapon is being used. Further, flange 54 is a gas seal when pressed against the skin of the fish. A plurality of circumferential cuts 56 forming circumferential edges 58 that are sloped rearwardly of the point 59 of weapon 10, also serve as gas seals when the head is plunged into the fish. The shape and design of the head may be altered, but the gas sealing means are important so that the gas discharged through passage 30 and into the fish by way of transverse passage 62 near point 59 and communicated with passage 30 may be prevented from escaping through the opening in the fish made by head 50.

In use, the weapon 10 takes the place of a dagger or hunting knife. Upon thrusting the head 50 into the fish, shank 28 moves rearwardly thereby rupturing flask 20 and enabling the gas under pressure therein to escape in the cavity 18 and ultimately into the fish by way of the passages and manifold that have been previously described.

Figure 6:
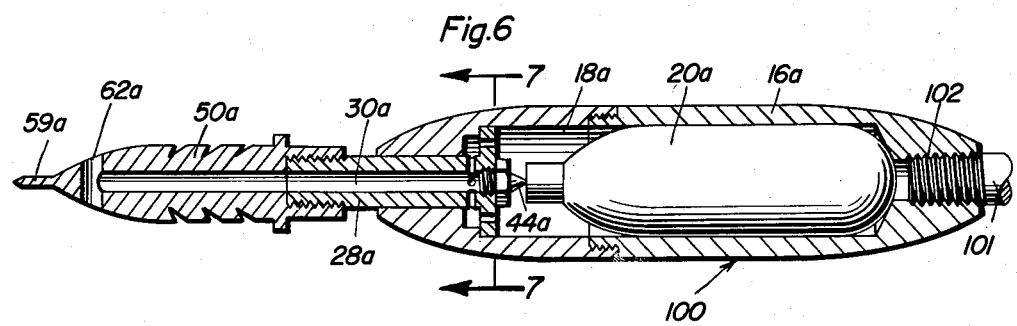
Figure 6 is an enlarged sectional view of the head of the weapon in Figure 5.
Figure 7:
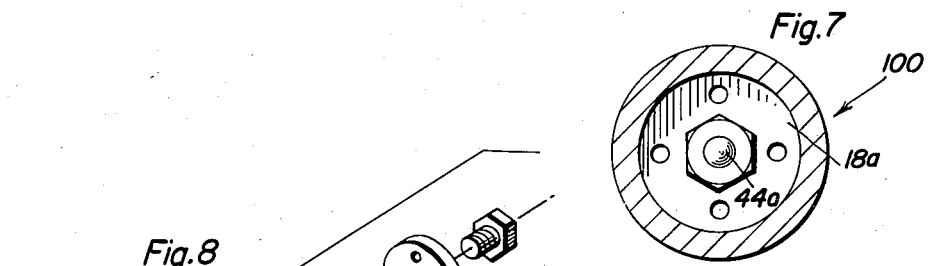
Figure 7 is a transverse sectional view taken on the line 7—7 of Figure 6.
Figure 8:
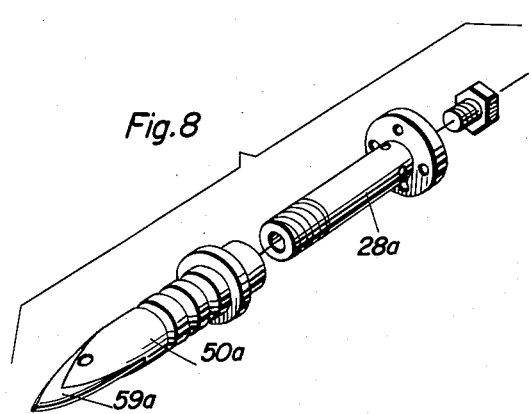
Figure 8 is a fragmentary exploded perspective view of a part of the weapon head in Figure 6.

Figures 5-8 show another application of the weapon. Weapon 100 is a spear, having a shank 101 threaded into an internally threaded bore 102 of section 16a. Apart from point 59a which is made flat, and liner 26 (Figures 2 and 3) which is optional, the construction of the weapon 100, and the internal operation i.e. gas flow, release, etc. is identical to that described in connection with weapon 10. Briefly, cavity 18a contains flask 20a opened by pin 44a. Gas flows from the flask into a portion of cavity 18a unoccupied by flask 20a and through passage 30a by way of the passages and manifold at the inner end of shank 28a. The gas is discharged through the outlet passage 62a in head 50a and enters the fish or the animal.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is a follows:

1. An underwater weapon comprising a body having a cavity therein to support a flask containing gas under pressure, said body having a bore, a shank mounted for reciprocation in said bore and having a longitudinal passageway therein, means registered with said passageway in said shank for establishing communication between said passageway and said cavity, piercing means connected to said shank and maintained poised adjacent to the flask so that upon movement of said shank in one direction with reference to said cavity body the flask is pierced thereby releasing gas under pressure therefrom which passes through said passageway, and said passageway having a gas discharge opening registered therewith, a head, means separably connecting said head to said shank, a portion of said passageway extending through at least a portion of said head, and gas sealing means operatively fixedly connected with said head on the exterior surface thereof to engage an underwater fish or the like and to prevent the escape of gas when said head penetrates the same.

2. An underwater weapon comprising a body having a cavity therein to support a flask containing gas under pressure, said body having a bore, a shank mounted for reciprocation in said bore and having a longitudinal passageway therein, means registered with said passageway in said shank for establishing communication between said passageway and said cavity, piercing means connected to said shank and maintained poised adjacent to the flask so that upon movement of said shank in one direction with reference to said cavity body the flask is pierced thereby releasing gas under pressure therefrom which passes through said passageway, and said passageway having a gas discharge opening registered therewith, a head, means separably connecting said head to said shank, a portion of said passageway extending through at least a portion of said head, and gas sealing means operatively fixedly connected with said head on the exterior surface thereof to engage an underwater fish or the like and to prevent the escape of gas when said head penetrates the same, said gas sealing means including a plurality of essentially circumferential grooves in said head with edges defined by said grooves.

3. An underwater weapon comprising a body having a cavity therein to support a flask containing gas under pressure, said body having a bore, a shank mounted for reciprocation in said bore and having a longitudinal passageway therein, means registered with said passageway in said shank for establishing communication between said passageway and said cavity, piercing means connected to said shank and maintained poised adjacent to the flask so that upon movement of said shank in one direction with reference to said cavity body the flask is pierced thereby releasing gas under pressure therefrom which passes through said passageway, and said passageway having a gas discharge opening registered therewith, a head, means separably connecting said head to said shank, a portion of said passageway extending through at least a portion of said head, and gas sealing means operatively fixedly connected with said head on the exterior surface thereof to engage an underwater fish or the like and to prevent the escape of gas when said head penetrates the same, said gas sealing means including a stop flange protruding laterally from said head and adapted to engage the skin of the fish when the head has penetrated the fish skin to a predetermined depth.

4. An underwater weapon comprising a body having a cavity therein to support a flask containing gas under pressure, said body having a bore, a shank mounted for reciprocation in said bore and having a longitudinal passageway therein, means registered with said passageway in said shank for establishing communication between said passageway and said cavity, piercing means connected to said shank and maintained poised adjacent to the flask so that upon movement of said shank in one direction with reference to said cavity body the flask is pierced thereby releasing gas under pressure therefrom which passes through said passageway, and said passageway having a gas discharge opening registered therewith, a head, means separably connecting said head to said shank, a portion of said passageway extending through at least a portion of said head, and gas sealing means operatively fixedly connected with said head on the exterior surface thereof to engage an underwater fish or the like and to prevent the escape of gas when said head penetrates the same, said gas sealing means including a stop flange protruding laterally from said head and adapted to engage the skin of the fish when the head has penetrated the fish skin to a determined depth, and said head being so formed as to provide approximately circumferential edges thereon between the point of said head and said flange.

5. An underwater weapon comprising a body having a cavity therein to support a flask containing gas under pressure, said body having a bore, a shank mounted for reciprocation in said bore and having a longitudinal passageway therein, means registered with said passageway in said shank for establishing communication between said passageway and said cavity, piercing means connected to said shank and maintained poised adjacent to the flask so that upon movement of said shank in one direction with reference to said cavity body the flask is pierced thereby releasing gas under pressure therefrom which passes through said passageway, and said passageway having a gas discharge opening registered therewith, a head, means separably connecting said head to said shank, a portion of said passageway extending through at least a portion of said head, and gas sealing means operatively fixedly connected with said head on the exterior surface thereof to engage an underwater fish or the like and to prevent the escape of gas when said head penetrates the same, said body containing said cavity having a pair of separably connected sections so that said flask may be removed and replaced.

6. An underwater weapon comprising a body having a cavity therein to support a flask containing gas under pressure, said body having a bore, a shank mounted for reciprocation in said bore and having a longitudinal passageway therein, means registered with said passageway in said shank for establishing communication between said passageway and said cavity, piercing means connected to said shank and maintained poised adjacent to the flask so that upon movement of said shank in one direction with reference to said cavity body the flask is pierced thereby releasing gas under pressure therefrom which passes through said passageway, and said passageway having a gas discharge opening registered therewith, a pointed head for penetration of an underwater fish, gas sealing means operatively fixedly connected with said head on the exterior surface thereof to engage an underwater fish and to prevent the escape of gas when said head penetrates the same, means separably connecting said head to said shank, a portion of said passageway extending through at least a portion of said head, said shank having an enlargement at the inner end thereof and occupying said cavity, a shoulder in said cavity against which said enlargement is adapted to seat in a rest position, and said enlargement and a portion of said shank adjacent thereto having gas passages therein with the manifold between the passages in said enlargement and said shank for the conduction of gases from the cavity to said passageway.

7. In an underwater weapon, the combination of an elongated body having a cavity therein to receive a removable flask containing gas under pressure, one end portion of said body being provided with a bore communicating with said cavity, a tubular shank reciprocable in said bore and projecting outwardly from said body, piercing means provided at the inner end of said shank for rupturing said flask and releasing gas therefrom into said cavity and shank, an enlarged pointed head provided at the outer end of the shank and having a gas passage therein in communication with the shank, and an annular flange fixedly connected with said head in spaced relation from the point thereof to engage an underwater animal whereby to slide said shank into said body when said flange comes in contact with such an animal upon penetration of the pointed portion of the head into the animal and whereby to seal the entry of the head into the animal by said flange to prevent escape of the released gas therefrom.

8. The device as defined in claim 7 wherein said body comprises a pair of separably connected complemental sections to facilitate insertion and replacement of said flask.

References Cited in the file of this patent

UNITED STATES PATENTS

| | | |
|---|---|---|
| 1,136,480 | O'Rawe | Apr. 20, 1915 |
| 2,617,359 | Van Horn et al. | Nov. 11, 1952 |
| 2,780,389 | Sandgren | Feb. 5, 1957 |
| 2,936,756 | Gabriel | May 17, 1960 |

FOREIGN PATENTS

| | | |
|---|---|---|
| 165,478 | Great Britain | June 30, 1921 |